United States Patent
Feehrer et al.

(10) Patent No.: US 8,631,181 B2
(45) Date of Patent: Jan. 14, 2014

(54) VALIDATING MESSAGE-SIGNALED INTERRUPTS BY TRACKING INTERRUPT VECTORS ASSIGNED TO DEVICES

(75) Inventors: John R. Feehrer, Westford, MA (US); Hugh R. Kurth, Woburn, MA (US); Carl F. Humphreys, Burlington, MA (US); David M. Kahn, Makawao, HI (US); John G. Johnson, San Jose, CA (US); Tayfun Kocaoglu, Los Gatos, CA (US); Gregory C. Onufer, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 177 days.

(21) Appl. No.: 13/245,541

(22) Filed: Sep. 26, 2011

(65) Prior Publication Data

US 2013/0080673 A1 Mar. 28, 2013

(51) Int. Cl.
*G06F 13/24* (2006.01)
(52) U.S. Cl.
CPC ..................................... *G06F 13/24* (2013.01)
USPC ........................................... 710/268; 710/260
(58) Field of Classification Search
USPC ................................................. 710/260–269
See application file for complete search history.

(56) References Cited

U.S. PATENT DOCUMENTS

| | | | |
|---|---|---|---|
| 7,325,084 B1 * | 1/2008 | Marmash et al. | 710/269 |
| 7,398,343 B1 * | 7/2008 | Marmash et al. | 710/269 |
| 7,565,471 B2 * | 7/2009 | Butler et al. | 710/260 |
| 2005/0228922 A1 * | 10/2005 | Tsao et al. | 710/268 |
| 2006/0015668 A1 * | 1/2006 | Nguyen et al. | 710/269 |
| 2009/0327556 A1 * | 12/2009 | Railing et al. | 710/267 |
| 2010/0161864 A1 * | 6/2010 | Barde et al. | 710/260 |
| 2010/0169528 A1 * | 7/2010 | Kumar et al. | 710/263 |
| 2010/0191889 A1 * | 7/2010 | Serebrin | 710/269 |
| 2011/0197003 A1 * | 8/2011 | Serebrin et al. | 710/267 |
| 2011/0289242 A1 * | 11/2011 | Srinivasan et al. | 710/22 |

* cited by examiner

*Primary Examiner* — Raymond Phan
(74) *Attorney, Agent, or Firm* — Park, Vaughan, Fleming & Dowler LLP; Mark Spiller

(57) ABSTRACT

The disclosed embodiments provide a system that validates message-signaled interrupts. During operation, the system receives a message-signaled interrupt from a requesting device. This message-signaled interrupt includes an interrupt vector that identifies an interrupt, and is accompanied by an identification tag that identifies the source of the interrupt. The system uses the interrupt vector to access a stored tag from a tracking mechanism that associates source devices with their assigned interrupt vector(s). The system then compares the identification tag and the stored tag to validate the message-signaled interrupt.

19 Claims, 5 Drawing Sheets

VALIDATING MESSAGE-SIGNALED INTERRUPTS BY TRACKING INTERRUPT VECTORS ASSIGNED TO DEVICES

BACKGROUND

1. Field of the Invention

This disclosure generally relates to interrupts in computer systems. More specifically, this disclosure relates to techniques for validating message-signaled interrupts that are received from connected devices.

2. Related Art

Recent advances in computational technology have led to improved processor capabilities, increased memory sizes, and increasingly sophisticated storage devices and peripherals. However, as the complexity of computer systems grows, ensuring that different components of a computer system interact as intended becomes more difficult.

For instance, consider the delivery of interrupts from the input/output (I/O) subsystem of a computer system. The time delay associated with delivering an interrupt to a processor, the frequency of interrupts, and the amount of time that the processor spends handling I/O interrupts can have a significant impact on user-perceived application performance. Interrupt-related complexity and delays can be especially apparent in virtualized servers, where many operating systems and applications simultaneously access and/or share hardware. Another set of issues involve erroneous (or malicious) interrupts that do not correctly indicate their source or destination, or create an interrupt load that overwhelms the processing resources assigned to a user.

Hence, what is needed are techniques for validating interrupts without the above-described problems.

SUMMARY

The disclosed embodiments provide a system that validates message-signaled interrupts. During operation, the system receives a message-signaled interrupt from a requesting device. This message-signaled interrupt includes an interrupt vector that identifies an interrupt, and is accompanied by an identification tag that identifies the source of the interrupt. The system uses the interrupt vector to access a stored tag from a tracking mechanism that associates source devices with their assigned interrupt vector(s). The system then compares the identification tag and the stored tag to validate the message-signaled interrupt.

In some embodiments, the system blocks the message-signaled interrupt if the identification tag and the stored tag do not match, thereby preventing other devices from sending interrupts using another device's assigned interrupt vector.

In some embodiments, the system probes an I/O interconnect fabric to determine a set of connected devices that can generate message-signaled interrupts. During this process, the system: (1) assigns a unique tag to each connected device; (2) assigns one or more unique interrupt vectors to each connected device; and (3) stores the mapping between the unique tags and their associated devices in the table to facilitate validating message-signaled interrupts.

In some embodiments, the message-signaled interrupt is an MSI/X transaction sent by the device over a PCI Express (PCIe) interconnect fabric.

In some embodiments, comparing the two tags involves associating the interrupt vector with a unique memory page and then accessing a translation table entry associated with the memory page.

In some embodiments, accessing the translation table entry may involve one or more of the following: determining a memory address associated with the interrupt vector; using the memory address to access the translation table entry; checking a valid bit in the translation table entry to determine that the interrupt vector is valid; checking an enable bit in the translation table entry to determine that the interrupt vector is enabled; and reading the stored tag from the translation table entry.

In some embodiments, determining the memory address involves shifting the interrupt vector to align to a memory page boundary and/or adding a base offset to the interrupt vector.

In some embodiments, multiple computing devices communicate using a coherency interconnect. In this environment, a first computing device receives a message-signaled interrupt that is destined for a second computing device. The first computing device first validates the interrupt, and then forwards the validated interrupt to the second computing device.

In some embodiments, the system queues the interrupt in an interrupt management unit while validating the interrupt. The system detects subsequent message-signaled interrupts from devices that have the same interrupt vector and identification tags as the queued interrupts, and filters them out.

DETAILED DESCRIPTION

Figure 1:
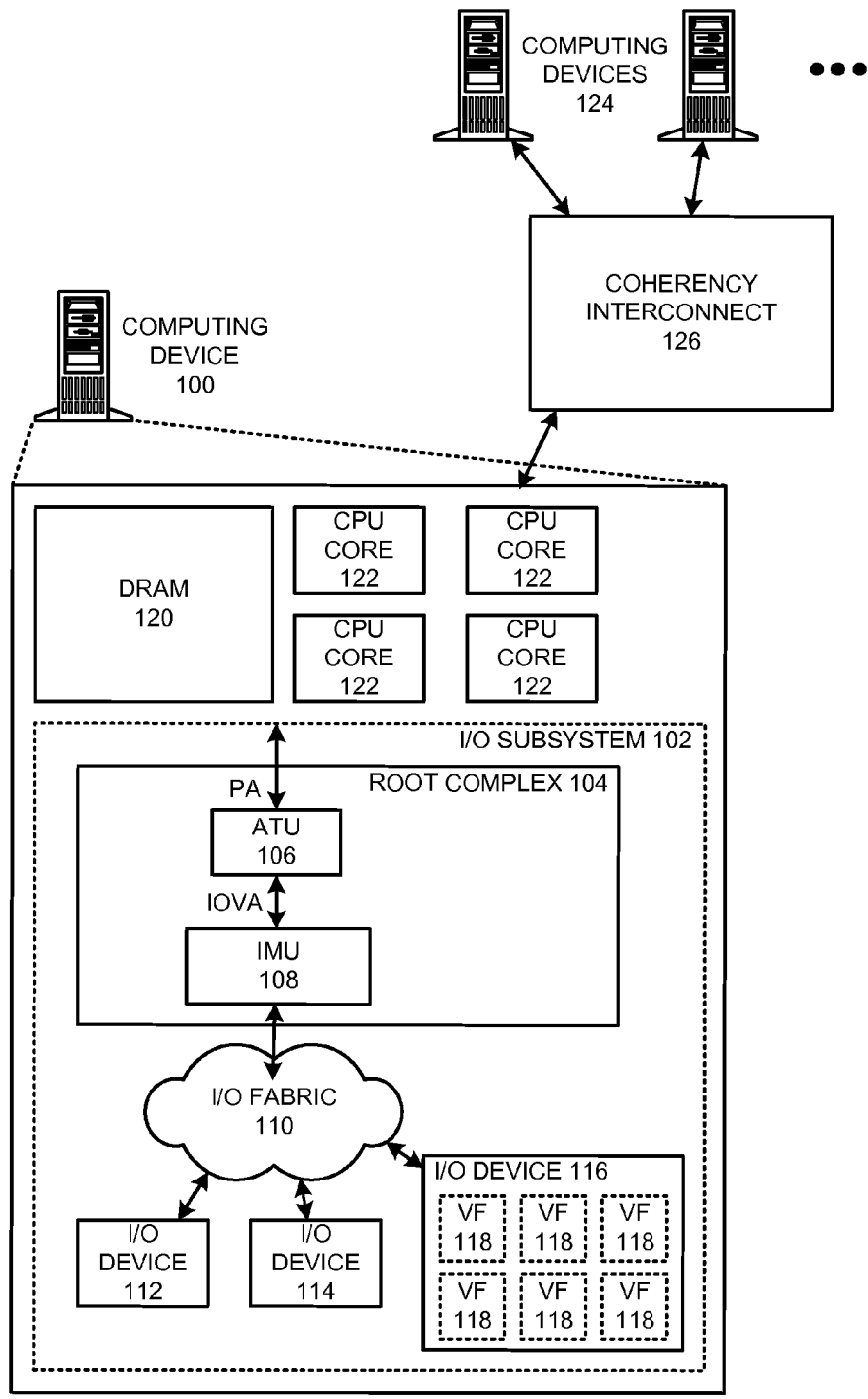
FIG. 1 illustrates an exemplary computing device which includes an I/O subsystem with multiple PCIe I/O devices in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Message-Signaled Interrupts

The performance of a computing device typically depends on a range of factors, including both the rate at which its processor can execute instructions as well as the speed with which target data can be accessed from I/O (input/output) devices and a memory subsystem. A processor's interrupt delivery architecture and the efficient handling of interrupts are important, because interrupts are often used in signaling data transfers from I/O devices and in conveying important status information to the processor. For instance, the I/O subsystem delay associated with delivering an interrupt to a processor, the frequency of interrupts, and the amount of time that the processor spends handling I/O interrupts can have a significant impact on user-perceived application performance.

Traditionally, I/O devices have included hardware interrupt pins that could be asserted to interrupt a host CPU. However, such architectures provided only a very limited number of pin-based hardware interrupts, and configuring these limited interrupts in a manner that avoided conflicts was often challenging. Message-signaled interrupts, defined in the PCI (Peripheral Component Interconnect) 2.2 architecture and carried forward into the PCI Express (PCIe) architecture, offer an alternative way to generate I/O interrupts. Message-signaled interrupts allow a device to signal an interrupt by writing a small amount of data to a special programmable address in the host device's memory space; interrupt transactions look like memory writes, but are distinguished by a destination address in a specially defined address range. An I/O host interface device (e.g., the "Root Complex" in a PCIe subsystem) detects such special destination address values and sends an interrupt to the CPU based on a data value carried in the interrupt.

While MSI functionality involves higher implementation complexity, it also has significant advantages over pin-based interrupts. On the hardware side, removing the dedicated hardware pins reduces the cost and complexity of PCIe connectors. Message-signaled interrupts also increase the number of interrupts that are possible. Where conventional PCI architectures were limited to four interrupts per card (and, because such interrupts were typically shared among all cards on the PCI bus, often resulted in each card using just one interrupt), message-signaled interrupts allow a much larger number of interrupts per card. Allowing each device to invoke many interrupts facilitates sending a range of interrupts for different situations and/or priority levels. For instance, a device may send different interrupts to indicate both errors/failures and a range of status updates (e.g., to indicate the completion of a direct memory access (DMA) transfer, to send a "heartbeat" message indicating the device is still alive, or to send status information such as "my queue is half full").

PCI defines two versions of messaged-signaled interrupt capabilities: MSI and MSI-X. MSI, which was first defined in PCI 2.2, allows each device to allocate 1, 2, 4, 8, 16 or 32 interrupts. Devices are programmed with a target address for interrupts (e.g., the address of a control register in the interrupt controller), and send ("write") a data word (often referred to as the "interrupt vector") that identifies the interrupt. MSI-X extends MSI, allowing devices to allocate up to 2048 interrupts and allowing each interrupt to be associated with a separate target address and data word. The MSI-X extensions overcome restrictions for some architectures (e.g., for targeting individual interrupts to different processors in a multi-processor system). Note that the term MSI/X can refer to either MSI or MSI-X transactions in the following description.

During system initialization, the I/O subsystem probes the PCIe topology (also referred to as "fabric") and, depending on each detected device's interrupt capabilities and requirements, assigns a unique "BDF" (e.g., a 16-bit bus/device/function value that uniquely identifies devices) and a unique set of MSI/X vectors to each device. This BDF is then included with all subsequent MSI/X interrupts and all data transactions (e.g., memory read/write requests), so that the I/O subsystem can identify the originator of each transaction. Note that a PCIe fabric may include multiple levels of bus and/or device hierarchy. For instance, PCIe switches may extend the PCIe fabric to allow more devices. The probing process needs to account for all levels of switches between the top-level "Root Complex" (host) and the endpoint devices. Note also that BDFs and interrupts are assigned based on the number of devices detected, and that individual devices typically do not know the BDF and MSI/X ranges associated with other devices (e.g., in a point-to-point PCIe topology, the assignment interactions for a given device are not visible to other devices).

Every device in a virtualized PCIe I/O subsystem operates in its own I/O virtual address space, and the Root Complex (RC) translates I/O virtual addresses to physical addresses for memory transfers and transactions. The RC also assembles and disassembles packets, for instance by breaking PCIe writes into (usually cache-line sized) host write requests and assembling memory read returns from host memory into PCIe completion packets. The RC also tracks the MSI/X base address registers that are used to determine whether an incoming PCIe memory write transaction is an MSI/X transaction. Upon determining that a memory write falls within the MSI/X region, the RC: (1) examines the data associated with the transaction to determine the interrupt's destination; (2) sends an interrupt request to that destination; and then (3) optionally may set a "filter" bit that facilitates dropping subsequent MSI/X interrupts from the same source while the pending interrupt is being handled. Note that in many cases well-behaved devices stop sending subsequent interrupts while the processor responds to a first interrupt. However, in some cases devices sending periodic interrupts and/or problematic devices may result in additional interrupts that overload the processor; filtering such repetitive interrupts can alleviate such overloading.

Note that increased system complexity can also increase the complexity of interrupt management. Many modern microprocessor chips are composed of multiple CPU cores that each simultaneously execute multiple threads. A typical server platform might tie together multiple multi-core microprocessor chips (sometimes referred to as "sockets") using a cache-coherency interconnect. In such an environment, an MSI/X transaction is usually directed toward a specific thread running on a specific CPU core, either on the local socket or a remote socket. Frequently the destination is a thread in a local core, but in a more general scenario the destination may also be a thread executing on a core in a remote socket. The interrupt handling system executing for the core/thread receiving an interrupt determines which PCIe device sent the MSI/X request, and queries that device to determine what subsequent steps to take (e.g., to read an error log register on the device, or to read a buffer in memory after receiving an interrupt that indicates that a DMA read has completed). After responding to the interrupt, the interrupt handler can also clear the corresponding RC filter bit, thereby re-enabling the receipt of that specified interrupt type from the device.

Another set of increased complexity (and additional capabilities) involves I/O devices that support PCI-Express Single Root I/O Virtualization (SR-IOV) capabilities. In a system supporting virtualization and SR-IOV, multiple guest operating systems (GOS's) can share hardware resources, including PCIe devices. For example, a PCIe Network Interface Card (NIC) supporting SR-IOV may support eight virtual functions (VF's); if the Root Complex also supports virtualization, it can allow eight independent GOS's to use the NIC simultaneously. Each virtual device is allocated a different function number (and hence a unique BDF tag), and the RC maintains independent address translation tables for each GOS. General design goals for virtualization are to prevent any one GOS from corrupting data that belongs to another GOS and, whenever possible, to isolate errors and performance perturbations to a single GOS.

FIG. 1 illustrates an exemplary computing device 100 which includes an I/O subsystem 102 with multiple PCIe I/O devices (112-116). More specifically, I/O subsystem 102 includes I/O fabric 110 that connects I/O devices 112-116 to a Root Complex 104. Upon initialization, Root Complex 104 probes I/O fabric 110 to detect I/O devices 112-116, and then assigns BDFs and one or more interrupt vectors to each I/O device 112-116. Note that I/O device 116 supports SR-IOV, and hence includes multiple VFs 118. Root complex 104 assigns each VF 118 a separate BDF and a separate set of interrupt vectors.

During operation, an I/O device 112-116 writes to a special MSI/X address to send an interrupt through I/O fabric 110 to Root Complex 104. An interrupt management unit (IMU) 108 compares all incoming writes from I/O devices 112-116 with one or more MSI/X base addresses. When IMU 108 detects an MSI/X transaction, it reads the data value and initiates a corresponding interrupt. Otherwise, the write address is converted by an address translation unit (ATU) 106 from an I/O virtual address (IOVA) to a physical address (PA). This memory address is then used to write the accompanying data into a memory (e.g., DRAM 120), from which it can be accessed by one or more CPU cores 122. Note that an I/O virtual address space is substantially similar in concept to processor virtual memory, but instead separates each I/O device into its own separate virtual address space. ATU 106 includes tables that map each device's IOVAs to PAs.

Consider an exemplary DMA read operation (e.g., an operation that reads data from an endpoint device and writes it to memory) in the context of FIG. 1. A CPU core 122 may set up a DMA transfer from an endpoint device (e.g., one of I/O devices 112-116) by performing programmed I/O writes to registers in the endpoint device to indicate a starting address and a number of bytes to read. The endpoint device sends a memory write transaction. IMU 108 compares the target address and determines that the transaction is not an MSI/X transaction. ATU 106 translates the address, and the data is written to DRAM 120. After sending all of the data to be written, the endpoint device sends an MSI/X transaction (e.g., a write to an appropriate MSI/X address) to generate an interrupt that notifies the processor (e.g., one of CPU cores 122) that the write is complete. IMU 108 compares the incoming address to the MSI/X base address(es), and upon determining a match, reads the interrupt number from the accompanying data value and notifies a CPU core 122 of the interrupt. The notified CPU core 122 can then look at the interrupt value to determine what is being signaled, and respond appropriately.

As described above, interrupts and data may be destined for other microprocessor chips and/or computing devices 124. In such instances, Root Complex 104 may detect that an incoming interrupt (and/or data transaction) is not destined for computing device 100, and forward the transaction information over coherency interconnect 126 to another computing device 124.

Unfortunately, message-signaled interrupts are prone to a range of vulnerabilities. Some systems may include a large number (e.g., hundreds) of physically distinct I/O devices and/or virtual functions sharing physical devices, in the form of numerous separate cards and/or cards using SR-IOV architectures. Some of these I/O devices may either erroneously or maliciously send inappropriate interrupts that can severely disrupt performance. A faulty GOS software and/or PCIe device hardware may mishandle MSI resources, and thus cause spurious interrupts which, if not managed properly, can severely disrupt performance. For example, a device that erroneously sends an incorrect interrupt value may: (1) disrupt a processor core/and or thread with a spurious interrupt; and (2) cause the filter bit to be set for that interrupt vector, thereby blocking subsequent interrupts with the same interrupt vector coming from the correct device (i.e., the device to which the interrupt vector has actually been allocated). Such spurious and/or missed interrupts can disrupt application execution and substantially reduce application performance. Furthermore, denial-of-service attacks can thereby be created to hamper a user's application by creating a large number of false interrupts that overwhelm the processing resources assigned to that user.

Embodiments of the present invention involve extending interrupt processing capabilities to validate message-signaled interrupts. The disclosed hardware mechanisms facilitate delivering and handling interrupts efficiently while providing security against misuse of MSI/X features and "rogue" interrupts that attempt to cripple system performance. Such mechanisms are especially important for virtualized servers, where many applications share the underlying hardware, and a basic design goal is to prevent one virtual function from affecting the performance or functionality of other virtual functions.

Validating Message-Signaled Interrupts

In some embodiments, an interrupt handling system tracks the set of interrupts that have been assigned to each I/O device, and then validates the source of each incoming message-signaled interrupt to ensure that no spurious or malicious interrupts are signaled. For instance, in the context of MSI/X, the disclosed system tracks the allocation of interrupt vectors to BDFs, and then checks the BDF associated with each incoming MSI/X transaction to ensure that I/O devices can only signal their allocated interrupts. Such validation checks guard against erroneous (and deliberate) changes to the interrupt vector, and hence facilitate detecting faults and potential interrupt-based attacks. Note that while the following description gives examples in the context of PCIe, MSI/X transactions and a Root Complex, the described techniques can be applied to any system and/or architecture that uses message-signaled interrupts.

Figure 2:
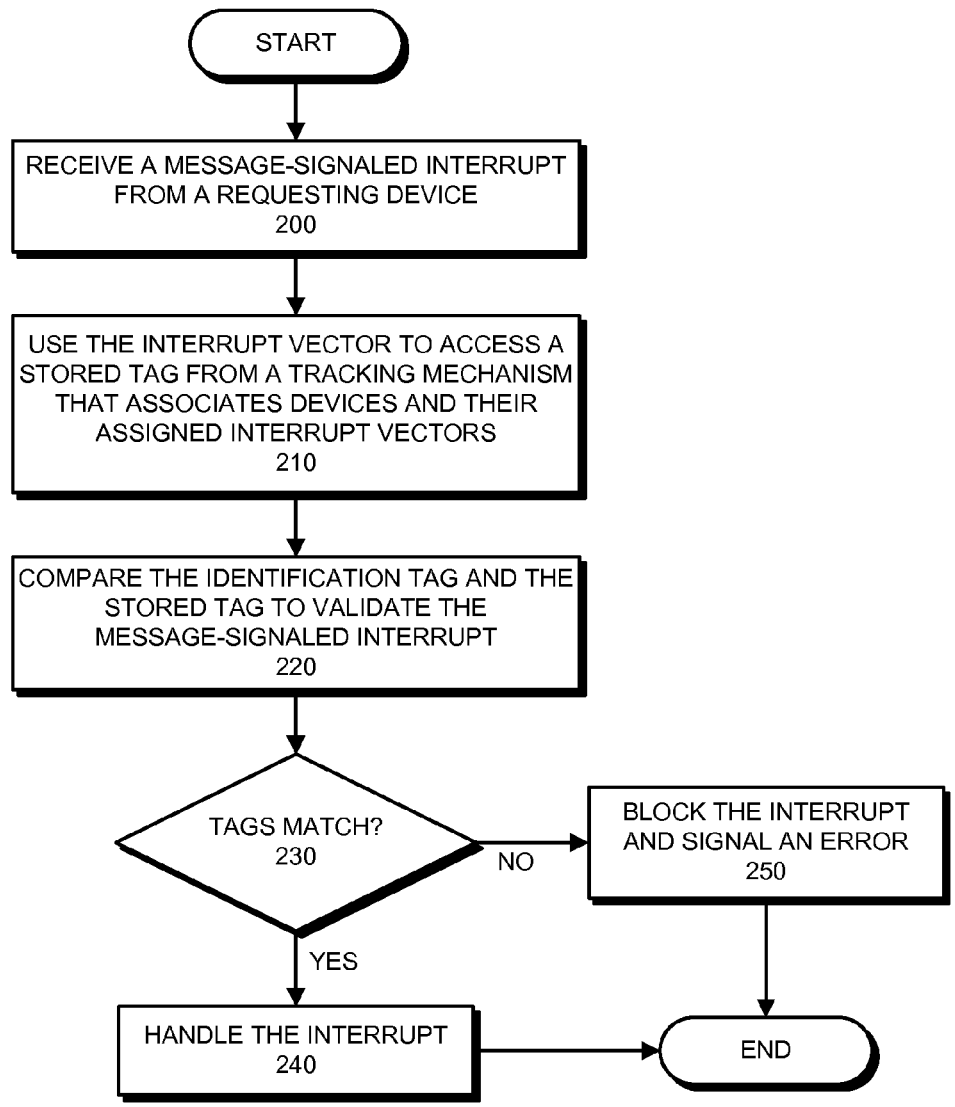
FIG. 2 presents a flow chart that illustrates the process of validating message-signaled interrupts in accordance with an embodiment.

FIG. 2 presents a flow chart that illustrates the process of validating message-signaled interrupts. During operation, the system receives a message-signaled interrupt from a requesting device (operation 200). This message-signaled interrupt includes an interrupt vector that identifies a specific interrupt. The message-signaled interrupt also includes (or is accompanied by) an identification tag that identifies its source. The system uses the interrupt vector to access a stored tag from a tracking mechanism that associates devices and their assigned interrupt vectors (operation 210). The system then compares this stored tag with the identification tag to validate the message-signaled interrupt (operation 220). If the tags match (operation 230), the system proceeds to handle the interrupt (operation 240). If the tags do not match (operation 230), the system blocks the interrupt and signals an error (operation 250), thereby preventing a second device from sending interrupts using the requesting device's interrupt vector.

Note that a range of tracking, storage, and look-up mechanisms may be used to associate devices and their assigned interrupt vectors. For instance, in some embodiments, a dedicated lookup table may be used to associate interrupt vectors with device identification tags (e.g., BDFs). For instance, such mappings can be stored in the table (or another tracking mechanism) during initialization, when the RC is probing the I/O interconnect and assigning BDFs and interrupt vectors to each connected device. In alternative embodiments, the system may leverage existing address translation tables and structures to take advantage of existing virtualization and protection capabilities. For example, the system may extend existing translation mechanisms (that operate at page granularities) by using translation table entries to track BDF and interrupt vector mappings. In such embodiments, the system may associate each interrupt vector with a unique memory page, and then access information associated with the interrupt vector from a translation table entry associated with that unique memory page (as described below).

Figure 3:
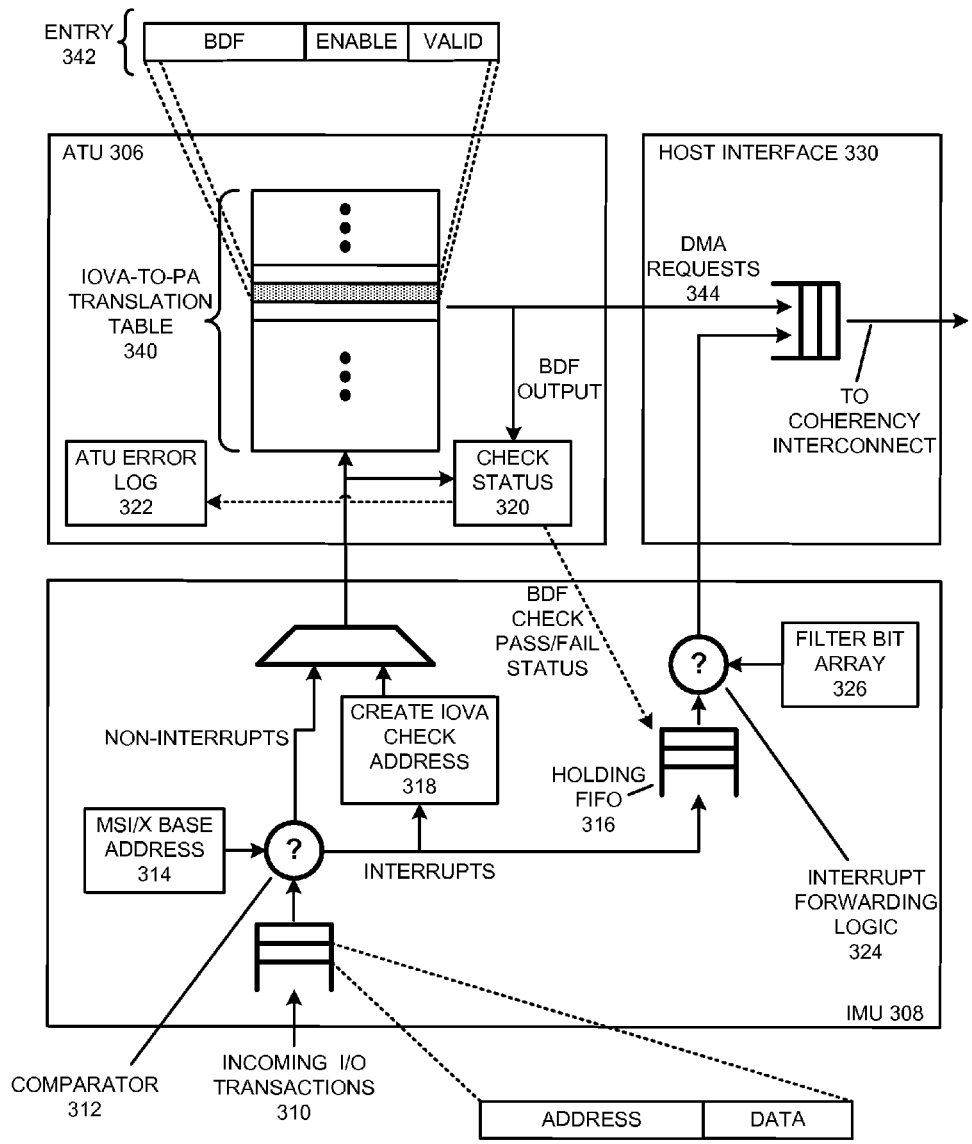
FIG. 3 illustrates the Root Complex of an exemplary I/O subsystem that validates message-signaled interrupts in accordance with an embodiment.

FIG. 3 illustrates the Root Complex of an exemplary I/O subsystem that validates message-signaled interrupts. A dedicated portion of the I/O virtual address space is allocated to storing mappings between BDFs and interrupt vectors. More specifically, each mapping is allocated its own separate memory page in a special "BDF check region" in IOVA space, so that each mapping has its own translation table entry 342 in an IOVA-to-PA translation table 340. This arrangement allows IOVA-to-PA translation table 340 to be used both for normal address translations as well as to validate message-signaled interrupts. In some implementations, table 340 in ATU 306 may cache a subset of entries from a complete table stored in main memory; in other implementations, the complete set of entries may be stored in ATU 306.

Note that in some embodiments, both DMA and MSI/X transactions may go through translation steps. For instance, the translation step for a DMA memory write request returns a PA to which a cache line will be written. For an MSI/X translation, the translation step involves looking up a translation table entry (TTE) to access a BDF value that is then used for a BDF validation check. The format of TTEs in IOVA-to-PA translation table 340 may vary based on their intended purpose. For instance, the format for a "normal" TTE (not shown) typically stores a PA and the access permissions for the given page. However, a different TTE format can be used to store information for MSI/X BDF validation checks (as shown for entry 342). This modified TTE format may store one or more of the following: a BDF number; an enable bit; and a valid bit. Because such modified entries are only used for BDF validation operations, attempts to otherwise read or write memory pages associated with such validation TTEs are erroneous. Hence, modified TTEs that are used for validation checks may also include access permission fields that allow ATU 306 to: detect invalid accesses; prevent such accesses from reaching memory; and flag any such attempts as access violation errors.

As mentioned above, during initialization, the system starts at the Root Complex and probes the I/O fabric to determine a set of attached devices. During this probing process the system assigns BDF values to these devices, and then allocates one or more interrupt vectors for each device. During this allocation process, the system also allocates an IOVA memory page (in the special BDF check region) for each interrupt vector (e.g., with the first word of each page containing the BDF value associated with the interrupt vector). The TTEs generated for these pages are then later used for BDF validation checks.

During operation, IMU 308 receives a set of incoming I/O memory write transactions 310. IMU 308 uses a comparator 312 to determine whether each given transaction's address falls into one or more virtual memory regions defined by stored MSI/X base address(es) 314. If the transaction is a normal memory write, the IOVA address and corresponding data are forwarded to ATU 306 (e.g., the "non-interrupts" path in FIG. 3), which determines the destination PA using IOVA-to-PA translation table 340, and then forwards the DMA request 344 (e.g., the PA and the data to be written) to host interface 330. Host interface 330 forwards this request to the coherency interconnect.

Figure 4:
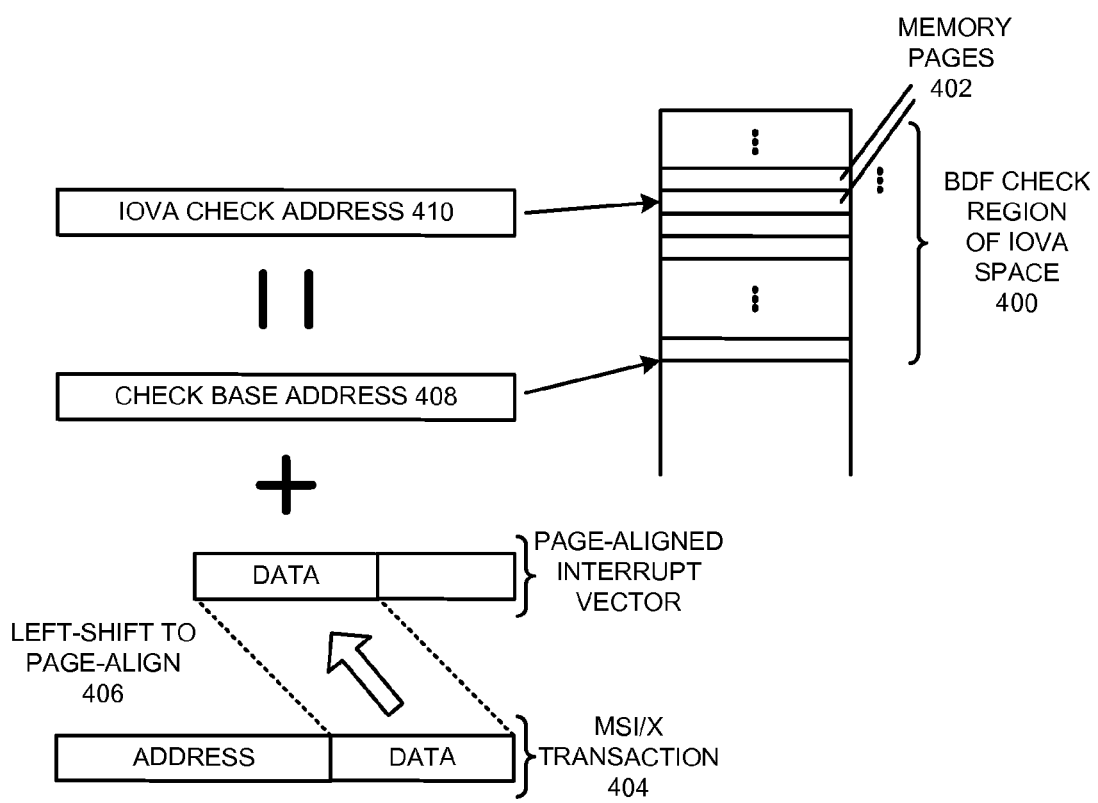
FIG. 4 illustrates an exemplary process for generating an IOVA check address for an interrupt vector in accordance with an embodiment.

If comparator 312 determines that the target address is in an MSI/X region, IMU 308 identifies the transaction as a message-signaled interrupt (e.g., the "interrupts" path in FIG. 3). In this case, the system queues the transaction in an internal holding FIFO 316 and initiates a BDF validation check, as follows:

First, IMU 308 converts the MSI/X transaction address to create an IOVA check address 318 that corresponds to the given interrupt vector (as described in more detail for FIG. 4).

Next, ATU 306 uses this IOVA check address to access the corresponding entry 342 in IOVA-to-PA translation table 340. Using entry 342, ATU 306 checks whether: (1) the entry is valid; (2) the interrupt is enabled; and (3) the BDF for the transaction matches the BDF in entry 342.

ATU 306 checks the status 320 of the comparison results:
If the entry indicated by the IOVA check address is not valid, ATU 306 logs the failure (e.g., as a "Virtual Table Entry (VTE) Invalid Error") in the ATU error log 322, and signals the error.
If the interrupt indicated by the IOVA check address is not enabled, ATU 306 may be configured to log an error or simply ignore the interrupt.
If the indicated entry is enabled and the stored BDF does not match the source of the message-signaled interrupt, ATU 306 logs the failure (e.g., by logging the two BDFs and indicating an "MSI BDF Mismatch error") and signals the error.
Otherwise, the validation check passes.

ATU 306 sends the BDF and pass/fail status back to IMU 308, which uses this status information to determine how to proceed:

If the validation check failed, IMU 308 dequeues and discards the corresponding MSI/X transaction from holding FIFO 316.

If the validation check passed, interrupt forwarding logic 324 in IMU 308 checks a filter bit array 326 to determine whether filtering has been enabled for the given MSI/X interrupt vector. If filtering is enabled for the interrupt, IMU 308 also dequeues and discards the corresponding MSI/X transaction. Otherwise, if filtering is not enabled for the interrupt vector, interrupt forwarding logic 324: (1) sets the corresponding filter bit in filter bit array 326; (2) dequeues the MSI/X transaction; and (3) sends the interrupt request to host interface 330 along with a destination socket, core, and thread. Host interface 330 then constructs an interrupt request packet that is forwarded to the coherency interconnect.

Note that other non-BDF-check traffic can be allowed to proceed while a BDF check operation is being performed for a given MSI/X transaction. DMA requests, incoming PCIe messages, and programmed I/O read returns have no ordering requirements with respect to MSI/X transactions, and hence passing such traffic through does not cause any ordering violations.

FIG. 4 illustrates an exemplary process for generating an IOVA check address for an interrupt vector. A special region 400 of IOVA space is reserved for BDF validation checks; the beginning of this check region 400 is indicated by a (programmable) check base address 408. Each interrupt vector includes a unique data value that is associated with a memory page 402 within check region 400. An IMU 308 that has identified an MSI/X transaction 404 left-shifts 406 the corresponding interrupt vector (e.g., the data portion of MSI/X transaction 404) to align it to a page boundary. For instance, a system page size of 8 KB would correspond to shifting the MSI/X interrupt vector left thirteen bits. By page-aligning each interrupt vector, the system ensures that there is a separate BDF-check TTE entry for each MSI/X vector supported by the Root Complex.

After page-aligning the interrupt vector, the system adds the page-aligned interrupt vector to check base address 408 to generate an IOVA check address 410 that indicates the specific memory page associated with the given interrupt vector. IOVA check address 410 can then be used to access the corresponding TTE entry that is associated with the interrupt vector. Note that the size of BDF check region 400 depends on both the system page size and the number of supported interrupt vectors. For example, if the page size is 8 KB, and the system supports 1024 distinct interrupts, BDF check region 400 would be 8 MB. Doubling the number of interrupt vectors to 2048 would result in a 16 MB BDF check region 400. Note also that other system constraints may affect the number of supported interrupt vectors. For instance, the size of filter bit array 326 increases with the number of supported interrupt vectors; hence, system designers may need to carefully select the number of supported interrupt vectors to conserve a range of system and/or hardware resources.

In some embodiments, the system may reduce RC-to-CPU interrupt traffic by aggregating interrupts. For instance, the system may include one or more event queues that are stored in memory. The RC may check these event queues whenever it successfully validates an interrupt vector, and only forward an associated interrupt packet to the processor if the event queue associated with that interrupt vector would go from empty to non-empty as a result of receiving this new interrupt (e.g., thereby ensuring that a new interrupt packet for an interrupt vector is only sent when no similar interrupt has already been queued).

In some embodiments, an ATU may be configured to support a "pass-through" mode where translations are disabled and the BDF validation check is effectively disabled (i.e., the ATU always returns a successful check result). For example, such a pass-through mode might be used in diagnostic environments or by a hypervisor during system initialization (e.g., at a time when devices may not even have MSI/X capabilities enabled yet).

In some embodiments, an RC only serves the PCIe fabric for which it acts as a "root." More specifically, in an environment with multiple sockets (and where interrupts may be sent to remote sockets), an RC associated with a socket might only perform BDF checking and filtering for MSI/X interrupts that come from its local PCIe fabric. Validated interrupts can then be forwarded to remote sockets, where they will not need to be re-checked.

In summary, embodiments of the present invention validate message-signaled interrupts. Hardware mechanisms in an interrupt handling system track the set of interrupts that have been assigned to each I/O device, and then validate the source of each incoming message-signaled interrupt to ensure that no spurious or malicious interrupts are signaled. Such capabilities ensure that devices can use only assigned interrupt vectors, and facilitate detecting faults and preventing malicious denial-of-service attacks in I/O fabrics. Thus, the described techniques increase system resilience to I/O software bugs, hardware faults, and malicious attacks and thereby facilitate an improved virtualization experience.

Computing Environment

Figure 5:
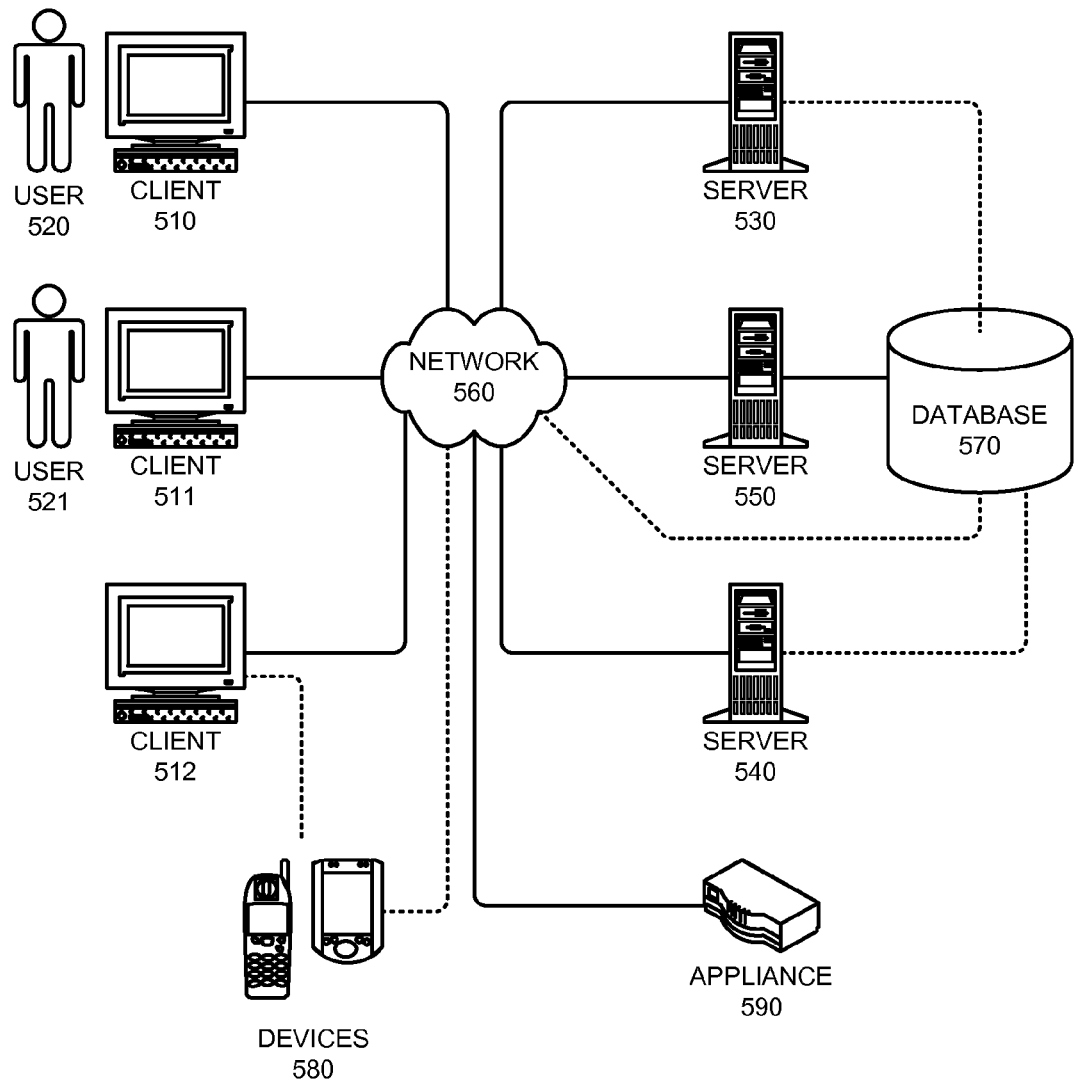
FIG. 5 illustrates a computing environment in accordance with an embodiment.

In some embodiments of the present invention, techniques for validating message-signaled interrupts can be incorporated into a wide range of computing devices in a computing environment. For example, FIG. 5 illustrates a computing environment 500 in accordance with an embodiment of the present invention. Computing environment 500 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 5, computing environment 500 includes clients 510-512, users 520 and 521, servers 530-550, network 560, database 570, devices 580, and appliance 590.

Clients 510-512 can include any node on a network that includes computational capability and includes a mechanism for communicating across the network. Additionally, clients 510-512 may comprise a tier in an n-tier application architecture, wherein clients 510-512 perform as servers (servicing requests from lower tiers or users), and wherein clients 510-512 perform as clients (forwarding the requests to a higher tier).

Similarly, servers 530-550 can generally include any node on a network including a mechanism for servicing requests from a client for computational and/or data storage resources. Servers 530-550 can participate in an advanced computing cluster, or can act as stand-alone servers. For instance, computing environment 500 can include a large number of compute nodes that are organized into a computing cluster and/or server farm. In one embodiment of the present invention, server 540 is an online "hot spare" of server 550.

Users 520 and 521 can include: an individual; a group of individuals; an organization; a group of organizations; a computing system; a group of computing systems; or any other entity that can interact with computing environment 500.

Network 560 can include any type of wired or wireless communication channel capable of coupling together computing nodes. This includes, but is not limited to, a local area network, a wide area network, or a combination of networks. In one embodiment of the present invention, network 560 includes the Internet. In some embodiments of the present invention, network 560 includes phone and cellular phone networks.

Database 570 can include any type of system for storing data in non-volatile storage. This includes, but is not limited to, systems based upon magnetic, optical, or magneto-optical storage devices, as well as storage devices based on flash memory and/or battery-backed up memory. Note that database 570 can be coupled: to a server (such as server 550), to a client, or directly to a network. In some embodiments of the present invention, database 570 is used to store information that may later be stored in unused bits of a memory pointer. Alternatively, other entities in computing environment 500 may also store such data (e.g., servers 530-550).

Devices 580 can include any type of electronic device that can be coupled to a client, such as client 512. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 580 can be coupled directly to network 560 and can function in the same manner as clients 510-512.

Appliance 590 can include any type of appliance that can be coupled to network 560. This includes, but is not limited to, routers, switches, load balancers, network accelerators, and specialty processors. Appliance 590 may act as a gateway, a proxy, or a translator between server 540 and network 560.

Note that different embodiments of the present invention may use different system configurations, and are not limited to the system configuration illustrated in computing environment 500. In general, any device that includes memory and I/O pathways may incorporate elements of the present invention.

Previously described FIG. 3 illustrates structures that can validate message-signaled interrupts. In some embodiments of the present invention, some or all aspects of ATU 306 and IMU 308 can be implemented as dedicated hardware modules in a computing device. For example, a computing device can include one or more specialized circuits for performing the operations of the mechanisms. Alternatively, some or all of the operations of ATU 306 and IMU 308 may be performed using general-purpose circuits in the computing device that are configured using processor instructions.

Although ATUs 106/306 and IMUs 108/308 are illustrated and/or described as being included in a Root Complex of an I/O subsystem in FIGS. 1 and 3 and their accompanying description, in alternative embodiments some or all of the described mechanisms can be either external or internal to a Root Complex and/or I/O subsystem. For instance, these mechanisms may be incorporated into hardware modules that can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for validating message-signaled interrupts, the method comprising:
  receiving a message-signaled interrupt from a requesting device, wherein the message-signaled interrupt includes an interrupt vector that identifies an interrupt, wherein receiving the message-signaled interrupt comprises receiving an identification tag that identifies the source of the message-signaled interrupt;
  using the interrupt vector to access a stored tag from a tracking mechanism that associates devices and assigned interrupt vectors; and
  comparing the identification tag and the stored tag to validate the message-signaled interrupt, wherein validating the message-signaled interrupt comprises, when the identification tag and the stored tag do not match, blocking and discarding the message-signaled interrupt, thereby preventing a second device from sending interrupts using the interrupt vector associated with the requesting device.

2. The computer-implemented method of claim 1, wherein the method further comprises:
  probing an I/O interconnect fabric to determine a set of connected devices that can generate message-signaled interrupts;
  assigning a unique tag to each connected device;
  assigning one or more interrupt vectors uniquely to each connected device; and
  storing the mapping between tags and their associated devices to facilitate validating message-signaled interrupts.

3. The computer-implemented method of claim 2,
  wherein multiple computing devices communicate using a coherency interconnect;
  wherein a computing device receives the message-signaled interrupt from the requesting device through the I/O interconnect fabric;
  wherein the message-signaled interrupt is destined for a second computing device not associated with the I/O interconnect fabric; and
  wherein the method further comprises forwarding the validated message-signaled interrupt to the second computing device.

4. The computer-implemented method of claim 1, wherein comparing the tags comprises:
  queuing the interrupt in an interrupt management unit;
  detecting a subsequent message-signaled interrupt with the same interrupt vector from the requesting device;
  determining that the message-signaled interrupt from the requesting device is already queued in the interrupt management unit; and
  filtering out the subsequent message-signaled interrupt.

5. The method of claim 1, wherein discarding the message-signaled interrupt comprises dequeuing the interrupt without sending the interrupt to a thread for processing the interrupt.

6. The method of claim 1, wherein discarding the interrupt comprises signaling an error.

7. The computer-implemented method of claim 2, wherein the message-signaled interrupt is an MSI/X transaction sent by the device over a PCI Express (PCIe) interconnect fabric.

8. The computer-implemented method of claim 2, wherein comparing the identification tag and the stored tag further comprises:
   associating the interrupt vector with a unique memory page; and
   accessing information associated with the interrupt vector from a translation table entry associated with the unique memory page.

9. The computer-implemented method of claim 8, wherein accessing information associated with the interrupt vector from the translation table entry comprises:
   determining a memory address associated with the interrupt vector;
   using the memory address to access the translation table entry;
   checking a valid bit in the translation table entry to determine that the interrupt vector is valid;
   checking an enable bit in the translation table entry to determine that the interrupt vector is enabled; and
   reading the stored tag from the translation table entry.

10. The computer-implemented method of claim 9, wherein determining the memory address comprises:
    shifting the interrupt vector to align to a memory page boundary; and
    adding a base offset to the interrupt vector.

11. A computing device configured to validate message-signaled interrupts, comprising:
    a processor; and
    a validation mechanism that receives a message-signaled interrupt from a requesting device,
    wherein the message-signaled interrupt includes an interrupt vector that identifies an interrupt;
    wherein receiving the message-signaled interrupt comprises receiving an identification tag that identifies the source of the message-signaled interrupt; and
    wherein the validation mechanism is configured to:
       use the interrupt vector to access a stored tag from a tracking mechanism that associates devices and assigned interrupt vectors; and
       compare the identification tag and the stored tag to validate the message-signaled interrupt, wherein while validating the message-signaled interrupt, the validation mechanism is configured to block and discard the message-signaled interrupt when the identification tag and the stored tag do not match, thereby preventing a second device from sending interrupts using the interrupt vector associated with the requesting device.

12. The computing device of claim 11,
    wherein the computing device further comprises an I/O interconnect fabric; and
    wherein the processor is configured to:
       probe the I/O interconnect fabric to determine a set of connected devices that can generate message-signaled interrupts;
       assign a unique tag to each connected device;
       assign one or more interrupt vectors uniquely to each connected device; and
       store the mapping between tags and their associated devices to facilitate validating message-signaled interrupts.

13. The computing device of claim 11, wherein comparing the tags further comprises:
    queuing the interrupt in an interrupt management unit in the processor;
    detecting a subsequent message-signaled interrupt with the same interrupt vector from the requesting device;
    determining that the message-signaled interrupt from the requesting device is already queued in the interrupt management unit; and
    filtering out the subsequent message-signaled interrupt.

14. The computing device of claim 12, wherein the message-signaled interrupt is an MSI/X transaction sent by the device over a PCI Express (PCIe) interconnect fabric.

15. The computing device of claim 12, wherein the validation mechanism is configured to compare the identification tag and the stored tag by:
    associating the interrupt vector with a unique memory page; and
    accessing information associated with the interrupt vector from a translation table entry associated with the unique memory page.

16. The computing device of claim 12,
    wherein multiple computing devices communicate using a coherency interconnect;
    wherein the computing device receives the message-signaled interrupt from the requesting device through the I/O interconnect fabric;
    wherein the message-signaled interrupt is destined for a second computing device not associated with the I/O interconnect fabric; and
    wherein the method further comprises forwarding the validated message-signaled interrupt to the second computing device.

17. The computing device of claim 15, wherein the validation mechanism is configured to access information associated with the interrupt vector from the translation table entry by:
    determining a memory address associated with the interrupt vector;
    using the memory address to access the translation table entry;
    checking a valid bit in the translation table entry to determine that the interrupt vector is valid;
    checking an enable bit in the translation table entry to determine that the interrupt vector is enabled; and
    reading the stored tag from the translation table entry.

18. The computing device of claim 17, wherein determining the memory address comprises:
    shifting the interrupt vector to align to a memory page boundary; and
    adding a base offset to the interrupt vector.

19. A non-transitory computer-readable storage medium storing instructions that when executed by a computer cause the computer to perform a method for validating message-signaled interrupts, the method comprising:
    receiving a message-signaled interrupt from a requesting device, wherein the message-signaled interrupt includes an interrupt vector that identifies an interrupt, wherein receiving the message-signaled interrupt comprises receiving an identification tag that identifies the source of the message-signaled interrupt;
    using the interrupt vector to access a stored tag from a tracking mechanism that associates devices and assigned interrupt vectors; and comparing the identification tag and the stored tag to validate the message-signaled interrupt, wherein validating the message-signaled interrupt comprises, when the identification tag and the stored tag do not match, blocking and discarding the message-signaled interrupt, thereby preventing a second device from sending interrupts using the interrupt vector associated with the requesting device.

* * * * *